March 2, 1965   J. F. LEAHY   3,171,624
PIPE HANGER
Filed Nov. 13, 1962
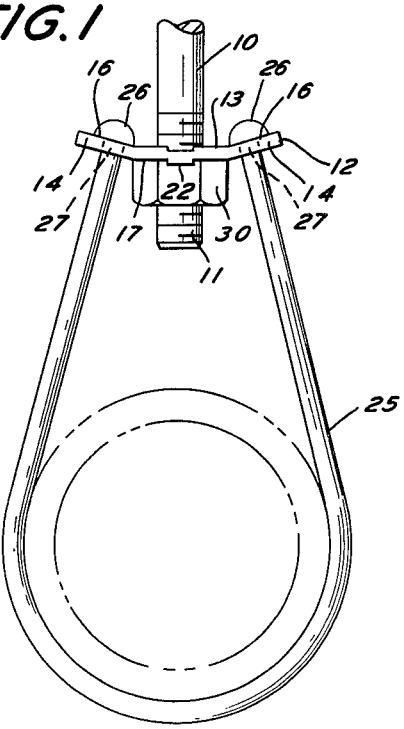
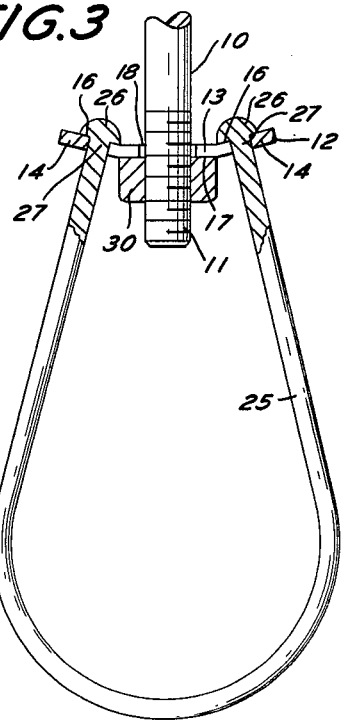
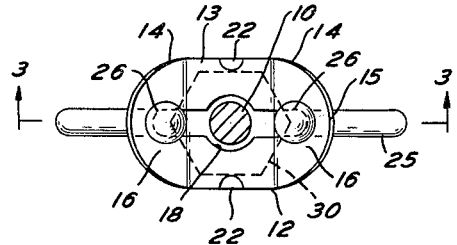
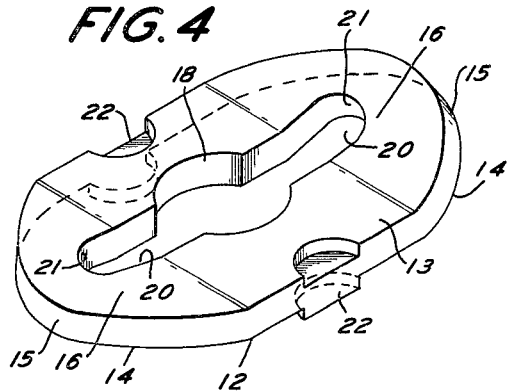
INVENTOR.
JOHN F. LEAHY
BY
ATTORNEY

United States Patent Office 3,171,624
Patented Mar. 2, 1965

3,171,624
PIPE HANGER
John F. Leahy, Ardmore, Pa. (% Service Pipe & Supply Co. Inc., 3380 Tulip St., Philadelphia 34, Pa.)
Filed Nov. 13, 1962, Ser. No. 237,042
2 Claims. (Cl. 248—62)

This invention relates to pipe hangers.

Various pipe hangers have heretofore been proposed but most of these, if of adequate strength, are of complex and relatively expensive construction.

It has been proposed to provide a pipe hanger having a yoke for receiving the ends of a pipe carrying wire loop with a nut of special shape having a tapered portion in frictional engagement with the wire loop to retain the loop in seated position. The complexity of the components of that device made it unduly difficult to manufacture. It was also not positively locked against change of position of the nut in the event of vibration.

It is the principal object of the present invention to provide a pipe hanger having exceedingly simple components, one of which can be made as a metal stamping.

It is a further object of the present invention to provide a pipe hanger having exceedingly simple components which can be quickly and easily assembled on the job.

It is a further object of the present invention to provide a pipe hanger which has provisions for easy adjustment with locking in adjusted position.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in elevation of a pipe hanger in accordance with the invention;

FIG. 2 is a top plan view of the pipe hanger shown in FIG. 1;

FIG. 3 is a vertical sectional view taken approximately on the line 3—3 of FIG. 2; and FIG. 4 is a view in perspective of the supporting plate employed in connection with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated a vertical suspension rod 10 of well known type is shown having a threaded lower end 11. The rod 10 is mounted in any desired manner which mounting does not form a part of the present invention.

As a component of the invention, a metal supporting plate 12 is provided having a flat central section 13 with opposite flat upwardly inclined end sections 14. The end sections 14 have curved margins 15 and upper flat bearing surfaces 16. While the inclination of the end sections 14 can be varied as desired, in a particular embodiment this can be at an angle of the order of 15°.

The central section 13 has a bottom face 17 and an enlarged central opening 18 of a size freely to receive the threaded end 11 of the rod 10, with opposite diametrically disposed slots 20 extending therefrom into the end sections 14. The outer ends 21 of the slots 20 are normal to the planes of the end sections 14 and accordingly inclined with respect to the plane of the central section 13.

The central section 13 at opposite sides thereof has struck down holding tongues 22, for purposes to be explained, on opposite sides of the bottom face 17.

It will be noted that the plate 12 can be readily made as a stamping from sheet metal and in one particular embodiment of a thickness of the order of one eighth of an inch.

As another component of the invention a loop 25 is employed, preferably made of resilient round wire, and with enlarged heads 26 formed thereon. The distance between the ends 27 of the loop 25 at the heads 26 is preferably the same as or even slightly greater than the distance between the outer ends 21 of the slots 20 so as to seat the ends 27 in the slots 20.

In order to position the plate 15 at the desired location on the threaded end 11 of the rod 10 a nut 30, of conventional type, can be employed bearing on the lower face 17. The nut 30 can have a square head or hexagonal head, as desired, which is prevented from turning by engagement with the holding tongues 22.

In use the loop 25, sprung a round a pipe to be supported by separation of the ends 27 is then assembled to the plate 12 by passing first one and then the other of the heads 26 upwardly through the central opening. The heads 26 can be moved towards each other if desired. The ends 27 of the loop 25 are then successively seated in the slots 20 and spring or are sprung outwardly for this purpose. The plate 12 is then moved so that the rod 10 extends downwardly therethrough and the nut 30 applied in the threaded end 11. The rod 10 can then be turned to position the plate 12 and at the desired vertical location. Or, if desired, the plate 12 can be raised so that the tongues 22 clear the nut 30, the nut 30 turned to the desired elevation and the plate 12 lowered to rest thereon. The tongues 22 prevent undesired shift in vertical position even under severe conditions of vibration.

I claim:

1. A pipe hanger assembly for support by a vertical threaded rod comprising a supporting plate of stamped sheet metal having a central section with a bottom face and upwardly inclined end sections with upper faces, said central section having a central opening therein intersecting said bottom face with opposite slots extending from said central opening into said end sections, a resilient pipe engaging loop having end portions received in said slots and enlarged heads inserted through said central opening and in engagement with the upper faces of said end sections and entirely supporting said loop, the end portions of said loop being urged toward the outer ends of said slots by the resiliency of the loop, said central opening being of a size accommodating the threaded rod between the end portions of said loop, and a nut on said rod disposed entirely below the bottom face of said central section and in supporting engagement with said bottom face with the end portions spaced outwardly from said nut providing operating access to said nut, said nut entirely supporting said plate and preventing inward displacement and removal of said end portions.

2. A pipe hanger as defined in claim 1 in which said central section of said plate at opposite sides of said central openings and spaced therefrom has downwardly extending nut engaging holding tongues offset from said opposite slots.

References Cited by the Examiner
UNITED STATES PATENTS

| | | | |
|---|---|---|---|
| 971,077 | 9/10 | Roberts | 248—59 |
| 993,510 | 5/11 | Cowles | 248—59 X |
| 1,698,571 | 1/29 | Van Cleve | 248—62 |
| 1,898,898 | 2/33 | Rowley | 248—59 |
| 1,904,315 | 4/33 | Kenway | 248—62 |
| 2,616,645 | 11/52 | Kindorf et al. | 248—62 |
| 2,762,592 | 9/56 | Adams | 248—62 X |
| 2,835,464 | 5/58 | Kolodin | 248—62 |
| 2,893,670 | 1/59 | Adams | 248—59 |
| 2,923,509 | 2/60 | Kolodin | 248—62 |

CLAUDE A. LE ROY, *Primary Examiner.*

FRANK L. ABBOTT, *Examiner.*